US006712914B2

(12) United States Patent
Suzuki et al.

(10) Patent No.: US 6,712,914 B2
(45) Date of Patent: Mar. 30, 2004

(54) NON-HEAT TREATED CRANKSHAFT

(75) Inventors: Daisuke Suzuki, Kitakyushu (JP);
Hitoshi Matsumoto, Kitakyushu (JP);
Yuzuru Tahara, Wako (JP); Shingo Shimizu, Wako (JP); Toru Taniguchi, Wako (JP); Yoshikazu Yamada, Wako (JP)

(73) Assignees: Sumitomo Metal Industries, Ltd., Osaka (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/459,476

(22) Filed: Jun. 12, 2003

(65) Prior Publication Data

US 2004/0000360 A1 Jan. 1, 2004

(30) Foreign Application Priority Data

Jun. 28, 2002 (JP) .................. 2002-191299
May 8, 2003 (JP) .................. 2003-130155

(51) Int. Cl.[7] .............................. C22C 38/24
(52) U.S. Cl. .................. 148/333; 148/904; 420/104
(58) Field of Search .................. 148/333, 904, 148/649; 420/104

(56) References Cited

U.S. PATENT DOCUMENTS 5,362,338 A * 11/1994 Iwama et al. ............. 148/334

FOREIGN PATENT DOCUMENTS

| JP | 08-120342 | 5/1996 | |
| JP | 09324241 | * 12/1997 | .......... C22C/38/00 |
| JP | 10-277705 | 10/1998 | |
| JP | 2000-265242 | 9/2000 | |
| JP | 2000-328193 | 11/2000 | |

* cited by examiner

Primary Examiner—Deborah Yee
(74) Attorney, Agent, or Firm—Clark & Brody

(57) ABSTRACT

A non-heat treated crankshaft which comprises, in % by mass, C: 0.30 to 0.35%, Si: 0.40 to 0.80%, Mn: 1.00 to 2.00%, S: 0.040 to 0.080%, Cr: 0.10 to 0.30% and V: 0.05 to 0.20%, with the balance being Fe and impurities, and of which microstructure is a ferrite-pearlite microstructure whose ferrite fraction $\alpha$ is 0.20 to 0.60 and average pearlite grain size Dp is 0.08 mm or less, and the value of Fn1 defined by the equation (1) being 0.73 or more, the value of Fn2 defined by the equation (2) being 1.20 or more and the value of Fn3 defined by the equation (3) being 0.64 or more, having excellent strength, low temperature toughness and wear resistance, so it can be applied to engines for working machine and general-purpose engines:

$$Fn1 = C + 0.10Si + 0.20Mn - 0.71S + 0.23Cr + 1.65V \quad (1),$$

$$Fn2 = 1.4 - 1.1 \times (1-\alpha) + 0.16\, Dp^{-\frac{1}{2}} \quad (2),$$

$$Fn3 = (1-\alpha) + \alpha \times (0.3Si + 0.8V) \quad (3),$$

where the symbols of the elements in the equations (1) and (3) respect the contents (% by mass) of the elements in the steel.

4 Claims, 9 Drawing Sheets

NON-HEAT TREATED CRANKSHAFT

This application claims priority under 35 U.S.C. § § 119 and/or 365 to the Japanese Patent Application Nos. 2002-191299 and 2003-130155 filed in Japan on Jun. 28, 2002 and May 8, 2003, respectively, the entire content of which is herein incorporated by reference.

FIELD OF THE INVENTION

The present invention relates to a non-heat treated crankshaft that uses "non-heat treated steel that exhibits, even when thermal refining after hot forging is omitted, excellent strength, excellent low temperature toughness and excellent wear resistance" and is preferable for use in general-purpose engines for such as lawn mowers, electric generators, snow blowers, pumps, and outboard motors.

BACKGROUND OF THE INVENTION

Machine structural steel parts, that have been so far used in automobiles and construction machinery, have been generally produced according to a method in which the steel for machine structural use (for instance, S48C and so on that are carbon steels for machine structural use defined in JIS G 4051) is formed into necessary part shapes by applying hot forging followed by applying quenching and tempering heat-treatment (so-called thermal refining) so as to endow necessary strength and toughness.

However, in recent years, in response to demands for cost reduction and lead-time reduction, development of "non-heat treated steels capable of being used as hot forged without applying thermal refining" have been forwarded, and now, the non-heat treated steels have rapidly expanded their applications and now focus on fields such as the automobiles and construction machinery.

As the demand for the non-heat treated steels spreads, the demands for higher performance non-heat treated steels and the cost reduction thereof, have become stronger and high-toughness non-heat treated steels, that can ensure excellent toughness even without applying the thermal refining and wear resistant non-heat treated steels that exhibit excellent wear resistance, even without applying surface hardening such as induction hardening and so on, have been proposed.

For instance, in Japanese laid-open patent application (JP Kokai) H08-120342, "Production of non-heat treated hot forged steel part having high strength and high toughness" is disclosed. According to the production method, a billet thereto, either a specified ratio of C, Mn, P and N is added followed by further adding one kind or more of V, Ti and Nb, or a specified ratio of C, Mn, Cr, V and B is added followed by further adding one kind or more of Ni, Cu and Mo is subjected to hot rolling, thereby steel whose austenite grain size number is controlled in a particular range is manufactured, thereafter the steel is subjected to hot forging controlled in a heating temperature, a temperature raising speed and a heating and holding period, and thereby non-heat treated hot forged parts, with high strength and high toughness, and having a microstructure mainly composing of a ferrite-pearlite, is produced.

Furthermore, in JP Kokai H10-277705, "Production of non-heat treated bar steel for high toughness hot forging" is disclosed. According to the production method, when a molten steel, whose carbon equivalent (Ceq.) is in the range of 0.7 to 1.30 and that contains a specified ratio of C, Si, Mn, Cr, V, Ti, N and Al, is continuously cast, a hot billet is formed under controlled cooling conditions, followed by heating and rolling under particular conditions, and thereby a bar steel is obtained.

Furthermore, in JP Kokai 2000-265242, "Non-heat treated steel for hot forging excellent in wear resistance" is proposed. In the steel, C is contained in a range of 0.40 to 0.70% (hereinafter "%" that shows a component ratio means "% by mass"), a specified ratio of Si, Mn, Cr, Al and N is contained, or as needs arise one kind or more of Pb, S, Te, Ca and Bi, that are machinability improvement elements, are further contained, a composition after the hot forging is a ferrite-pearlite microstructure, and an area ratio of pro-eutectoid ferrite is 10% or less.

Furthermore, in JP Kokai 2000-328193, "Non-refining steel for hot forging excellent in wear resistance" is disclosed. The hot forging non-heat treated steel contains C, Si and Mn at a specified ratio, or, as needs arise, further contains one kind or more of V, Nb and Ti, that are carbide- and nitride-forming elements, Cr that is a hardenability improvement element, Al that is an element that makes austenite grains finer and S, Pb, Zr, Ca, Te and Bi that are machinability improvement elements, and has a controlled amount of oxide inclusions, having a grain size larger than a particular value.

Working machines such as lawn mowers and electric generators, those are nowadays spreading into homes, are provided with a general-purpose engine called an "engine for working machine". In such an engine for working machine, a structure in which a working member, such as a cutter blade for use in lawn mower, is directly fixed to the crankshaft of the operating engine is frequently adopted, and it is inevitable that the impact load of the working member is directly transmitted to the crankshaft.

For instance, FIG. 1 is a schematic explanatory lateral sectional view showing an example of an internal structure of an engine in a lawn mower. A lawn mower cutter blade [2] as a working member is a solid body connected to a shaft end of the crankshaft [1] and the impact load to the lawn mower blade [2] is directly transmitted to the crankshaft [1].

Accordingly, in the crankshafts that are supplied for such applications, in addition to general demands, such as the strength and the wear resistance, the toughness in an application environment temperature region of the working machine, in particular very excellent low temperature toughness that can withstand the use even in cold regions, is demanded.

Accordingly, although many proposals relating to non-heat treated steels have been disclosed, it is generally known that as for machine structural steel parts, such as the crankshafts of engine for working machine that are required to be excellent in the low temperature toughness, in addition to the strength and the wear resistance, as identical as so far, the steel for machine structural use such as the S48C is hot forged, followed by applying the thermal refining due to quenching and tempering heat-treatment, and thereby predetermined low temperature toughness, wear resistance and strength are endowed.

The reason for the above is as follows:

As for the machine structural steel parts such as mentioned above, when existing non-heat treated steel is used as hot forged without thermal refining due to quenching and tempering heat-treatment, sufficiently satisfying low temperature toughness and wear resistance cannot be simultaneously obtained.

That is, since the low temperature toughness and the wear resistance of the steel are in a conflicting relationship, the non-heat treated steels that have been so far proposed are difficult to enhance both of the above properties simultaneously. For instance, all of the non-heat treated steels disclosed in the above-mentioned JP Kokai H08-120342, JP Kokai H10-277705, JP Kokai 2000-265242 or JP Kokai 2000-328193, in a state where the thermal refining is omitted, can neither ensure the low temperature toughness and the wear resistance needed to satisfy crankshafts of such as engines for working machine, nor sufficiently cope with demands for cost reduction and lead time reduction, due to the omission of the thermal refining.

SUMMARY OF THE INVENTION

The present invention intends to provide a non-heat treated crankshaft that can exhibit, even when thermal refining after hot forging is omitted, excellent strength, excellent wear resistance and excellent toughness.

The gist of the present invention is as follows:

(I) A non-heat treated crankshaft which comprises, in % by mass, C: 0.30 to 0.35%, Si: 0.40 to 0.80%, Mn: 1.00 to 2.00%, S: 0.040 to 0.080%, Cr: 0.10 to 0.30%, and V: 0.05 to 0.20%, with the balance being Fe and impurities, and of which the microstructure is a ferrite-pearlite microstructure whose ferrite fraction $\alpha$ is in the range of 0.20 to 0.60 and average pearlite grain size Dp is 0.08 mm or less, and the value of Fn1 defined by the following equation (1) being 0.73 or more, the value of Fn2 defined by the following equation (2) being 1.20 or more and the value of Fn3 defined by the following equation (3) being 0.64 or more:

$$Fn1 = C + 0.10Si + 0.20Mn - 0.71S + 0.23Cr + 1.65V \quad (1),$$

$$Fn2 = 1.4 - 1.1 \times (1-\alpha) + 0.16 Dp^{-\frac{1}{2}} \quad (2),$$

$$Fn3 = (1-\alpha) + \alpha \times (0.3Si + 0.8V) \quad (3),$$

wherein, in the above equations (1) and (3), the symbols of the elements represent the contents, in mass %, of the elements in the steel.

Here, the "ferrite-pearlite microstructure" means a mixed microstructure of a ferrite phase and a pearlite phase.

Furthermore, the "ferrite fraction $\alpha$" means an area ratio of the ferrite microstructure in the ferrite-pearlite microstructure confirmed by optical microscope observation, and "the ferrite fraction $\alpha$ is in the range of 0.20 to 0.60" means that a ratio of the ferrite phase in an observed field is in the range of 20% to 60%.

The "average pearlite grain size Dp" means an arithmetic mean value of dimensions of grains (grain size) of the pearlite phase confirmed with the optical microscope, and "grain size of the pearlite" means, so called "size of pearlite colony".

In order to further improve the toughness of the non-heat treated crankshaft described in the (I), in lieu of part of Fe, one or more elements selected from among Ti: 0.050% or less, Zr: 0.050% or less and Nb: 0.050% or less may be contained.

In order to improve the machinability of the non-heat treated crankshaft described in the (I), in lieu of part of Fe, one or both elements of Pb: 0.30% or less and Ca: 0.010% or less may be contained.

In order to further improve the toughness of the non-heat treated crankshaft described in the (I) and at the same time enhance the machinability thereof, in lieu of part of Fe, one or more elements selected from among Ti: 0.050% or less, Zr: 0.050% or less and Nb: 0.050% or less, and one or both elements of Pb: 0.30% or less and Ca: 0.010% or less may be contained.

As mentioned above, the symbols of the elements in the equations (1) and (3) respect the contents (% by mass) of the elements in the steel.

DETAILED DESCRIPTION OF THE INVENTION

Figure 1:
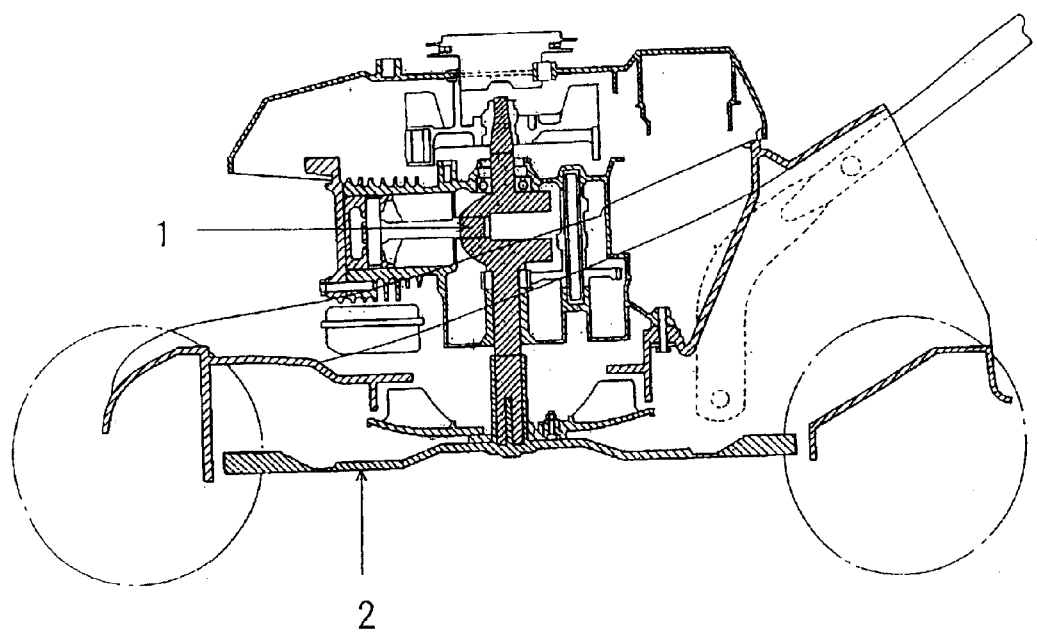
FIG. 1 is a schematic explanatory lateral sectional view showing an example of an internal structure of an engine in a lawn mower.

The present inventors have intensively studied the influence of chemical compositions and microstructures of steels on the strength, the wear resistance, and the toughness of non-heat treated steels. As a result, the following findings (a) through (d) were obtained.

(a) In order to improve the toughness, in particular the low temperature toughness of ferrite-pearlite type non-heat treated steel, that is, non-heat treated steel whose microstructure is a ferrite-pearlite microstructure; it is effective to reduce the C content in order to increase the ratio of the ferrite in the microstructure, and also to take advantage of the operation of S in order to make the pearlite microstructure (pearlite grain size) finer. That is, when a proper amount of S is secured in the ferrite-pearlite type non-heat treated steel, MnS, that is dispersed in the steel in the cooling process after hot working, becomes a precipitation site of the ferrite, and results in the finer pearlite microstructure. In combination with an increase of the ratio of the ferrite due to a decrease in the C content, the low temperature toughness can be improved.

(b) The tensile strength of the ferrite-pearlite type non-heat treated steel, having a specified chemical composition, has a correlation with Fn1 expressed by the equation (1), and, when the value of the Fn1 is controlled in order to be 0.73 or more, even when C is reduced so as to ensure necessary toughness, the tensile strength of 750 MPa or more can be stably obtained.

(c) In order to improve the wear resistance of the ferrite-pearlite type non-heat treated steel, it is effective to secure a predetermined amount of C in order to develop, to a certain extent, a large ratio of pearlite in the microstructure, and to add an element such as Si and V that has an effect of enhancing the hardness of the ferrite.

(d) However, only by simply controlling constituent components of the ferrite-pearlite type non-heat treated steel, both wear resistance and low temperature toughness, cannot be stabilized at sufficiently high levels.

When the relationship between the ferrite fraction α and the pearlite grain size Dp, in the microstructure, is controlled so that a value of Fn2, expressed by the equation (2), may be 1.20 or more, at −40 degree centigrade, excellent Charpy impact values such as 50 J/cm$^2$ or more can be stably obtained. When, in addition to the value of Fn2 expressed by the equation (2) being controlled at 1.20 or more, the value of Fn3, expressed by the equation (3) that is the relationship between the ferrite fraction α and the contents of Si and V in % by mass, is further controlled at 0.64 or more, sufficiently excellent wear resistance can be simultaneously secured, resulting in stabilizing both of the wear resistance and the low temperature toughness at sufficiently high levels.

That is, when the ferrite fraction α is enlarged in the ferrite-pearlite type non-heat treated steel that has a specified range of chemical composition and microstructure, the ductility is improved and the impact absorbed energy expands, resulting in improving the toughness, and when the pearlite grain size Dp is decreased, the ductile-brittle transition temperature is lowered, resulting in an improvement in the toughness. When the ferrite fraction α and pearlite grain size Dp are controlled so that the value of the Fn2 equation may be 1.20 or more, the low temperature toughness becomes excellent. Furthermore, in a ferrite-pearlite type non-heat treated steel like this, the pearlite fraction expands and the wear resistance improves, and the ferrite, that is inferior in the wear resistance to the pearlite, is strengthened by Si and V, which results in an improvement in the wear resistance. Accordingly, when the ferrite fraction α and the contents of Si and V in % by mass are controlled, so that the value of the Fn3 equation may be 0.64 or more, the sufficiently excellent wear resistance becomes simultaneously secured, which results in creating high wear resistance and excellent low temperature toughness.

The present invention is accomplished based on the above findings.

In the following, essentials of the invention will be detailed. As mentioned above, "%" expressions for the contents of the respective elements mean "% by mass".

(A) Chemical Components of Steel

C:

C enhances the tensile strength of the steel and, at the same time, forms pearlite and thereby enhances the wear resistance. In order to create steel with sufficient wear resistance, it is necessary for the steel to contain 0.30% or more of C. On the other hand, when C is contained exceeding 0.35%, a ratio of ferrite in the microstructure decreases, and in some cases, the toughness thereof decreases. Accordingly, the content of C is determined to be in the range of 0.30 to 0.35%.

Si:

Other than promoting the deoxidation of molten steel, Si dissolves in the ferrite and thereby enhances the hardness, and therefore improves both of the tensile strength and the wear resistance of the steel. In order to ensure this effect in the operation, it is necessary to contain 0.40% or more of Si. However, even when Si is excessively contained, exceeding 0.80%, the above effect saturates, resulting in only increasing the cost. Accordingly, the content of Si is determined to be in the range of 0.40 to 0.80%.

Mn:

Mn, in addition to deoxidating molten steel, improves the hardenability and thereby improves the tensile strength of the steel. In order to ensure this effect in the operation, it is necessary to contain 1.00% or more of Mn. However, when the Mn content exceeds 2.00%, the hardenability becomes too high and bainite results, and thereby, in some cases, the improvement effect of the wear resistance becomes saturated. Accordingly, the content of Mn is determined to be in the range of 1.00 to 2.00%.

S:

S, other than combining with Mn to form MnS and thereby enhancing the machinability of the steel, particularly worth noting in the cooling process after the hot forging, in which the MnS operates as a precipitation site of the ferrite. And thereby, S contributes to making the pearlite grains finer. Due to rendering the pearlite grains finer, the toughness of the steel is enhanced. In order to obtain the effects due to the operations, S is necessary to be contained 0.040% or more. However, when S is excessively added, the hot forging properties deteriorate, particularly, in some cases, when the content of S exceeds 0.080%, the hot forging properties remarkably deteriorate. Accordingly, the content of S is determined to be in the range of 0.040 to 0.080%.

Cr:

Cr is an element effective in enhancing the hardenability of the steel. In order to ensure this effect, Cr should contain 0.10% or more. However, when Cr is excessively added, not only the cost increases but also the hardenability becomes too high and bainite is generated, and, in some cases, the wear resistance improvement effect may become saturated. Accordingly, the content of Cr is determined to be in the range of 0.10 to 0.30%.

V:

V is an element that, in the cooling process after the hot forging of steel, precipitates as V carbonitride in the ferrite and enhances the hardness of the ferrite, resulting in an improvement in the tensile strength and the wear resistance. In order to ensure positive effects, it is necessary that the V content be 0.05% or more. On the other hand, when the V content is excessive, exceeding 0.20%, the effect may become saturated and the only result is cost increase. Accordingly, the content of V is determined to be in the range of 0.05 to 0.20%.

Ti, Zr and Nb:

Ti, Zr and Nb are optionally added. When added, they all form carbonitrides, and thereby inhibit austenite grains from growing coarser during hot forging and make the pearlite microstructure finer, resulting in the enhancing the toughness of the steel. Accordingly, as needs arise, one or more kinds of Ti, Zr and Nb are contained. However, when these elements are excessively contained, the effects lead to saturation. Accordingly, the upper limit of the content of all of Ti, Zr and Nb is set at 0.050%.

Pb and Ca:

Pb and Ca are optionally added. When added, both improve the machinability of the steel. Accordingly, as needs arise, one or more kinds of Pb and Ca are contained. However, when Pb is excessively added, in some cases, the hot forging properties of the steel may deteriorate, and also, when Ca is excessively added, inclusions are increased and in some cases, on the contrary the machinability of the steel may deteriorate. Accordingly, the upper limit of the Pb content is set at 0.30% and that of Ca is set at 0.010%.

(B) Microstructure of Steel (B-1) Ferrite Fraction α

With the increase of the ratio of the pearlite, which is inferior in the impact properties to the ferrite, the toughness of the steel, which has a ferrite-pearlite microstructure, deteriorates. On the other hand, when a ratio of the ferrite, which is inferior in the wear resistance to the pearlite, increases and the wear resistance of the steel, that has the ferrite-pearlite microstructure, deteriorates.

That is, when the ferrite fraction α of the ferrite-pearlite type non-heat treated steel, having a chemical composition according to the invention is under 0.20, sufficient toughness cannot be ensured. In particular, as the toughness at the test temperature of −40 degree centigrade, an excellent Charpy impact value of 50 J/cm$^2$ or more can only be ensured with difficulty. In addition, when the ferrite fraction α is over 0.60, it is difficult to create excellent wear resistance.

Accordingly, the ferrite fraction α in the ferrite-pearlite microstructure is determined to be in the range of 0.20 to 0.60.

The ferrite fraction α can be controlled by the adjustment of the contents of C, Si, Mn, Cr and V.

(B-2) Average Pearlite Grain Size Dp

In the ferrite-pearlite type non-heat treated steel, having a chemical composition according to the invention, by making the ferrite-pearlite microstructure finer, in particular, by making the pearlite grains finer, the toughness, particularly the low temperature toughness, can be improved. However, when the average pearlite grain size Dp is over 0.08 mm, sufficient toughness cannot be ensured. And so, an excellent Charpy impact value of 50 J/cm$^2$ or more at −40 degree centigrade can only be ensured with difficulty. Accordingly, the average pearlite grain size Dp is determined to be 0.08 mm or less.

The pearlite grain size can be controlled by adjusting the austenite grains at the hot forging and by taking advantage of the S addition.

(C) Values of Fn1, Fn2 and Fn3

The values of Fn1, Fn2 and Fn3, expressed by the aforementioned equations (1), (2) and (3) respectively, are closely connected with the strength, the toughness (Charpy impact value) and the wear resistance of the ferrite-pearlite type non-heat treated steel.

That is, when the value of Fn1 is controlled to be 0.73 or more, the high tensile strength of 750 Mpa or more can be ensured. In addition to controlling of Fn1 value, when the value of Fn2 is controlled to be 1.20 or more, the excellent toughness of Charpy impact value of 50 J/cm$^2$ or more at −40 degree centigrade also can be ensured, and at the same time, if the value of Fn3 is controlled to be 0.64 or more, the excellent wear resistance, needed to satisfy the crankshafts of machine engines, can be obtained.

In the following, above-mentioned matter will be detailed.

Steels having chemical compositions shown in Table 1 were manufactured through a similar melting process mentioned in the "Embodiment" section hereinafter. Thereafter forging and normalizing were performed, and then, microstructure observations, hardness measurements, tensile tests, Charpy impact tests at room temperature and at −40 degree centigrade, and finally wear tests were carried out.

A similar pin-disk type wear test mentioned in the "Embodiment" section hereinafter was used to evaluate the wear resistance.

In Table 1, together with the chemical compositions, microstructure observation results and the values of Fn1, Fn2 and Fn3 calculated from the chemical compositions and microstructure observation results, are shown. "F+P" in a microstructure column of Table 1 means a mixed microstructure of ferrite and pearlite, and "F+P+B" means a mixed microstructure of ferrite, pearlite and baite.

TABLE 1

| Steel | Chemical composition (% by mass) | | | | | | Microstructure | | | | | |
|---|---|---|---|---|---|---|---|---|---|---|---|---|
| | C | Si | Mn | S | Cr | V | Phase | α | Dp (mm) | Fn1 | Fn2 | Fn3 |
| A | 0.32 | 0.65 | 1.22 | 0.058 | 0.18 | 0.06 | F + P | 0.46 | 0.05 | 0.73 | 1.56 | 0.65 |
| B | 0.34 | 0.72 | 1.30 | 0.045 | 0.20 | 0.08 | F + P | 0.31 | 0.07 | 0.82 | 1.24 | 0.78 |
| C | 0.32 | 0.64 | 1.23 | 0.064 | 0.15 | 0.08 | F + P | 0.43 | 0.04 | 0.75 | 1.59 | 0.68 |
| D | 0.23 | 0.71 | 1.39 | 0.056 | 0.12 | 0.11 | F + P | 0.82 | 0.03 | 0.75 | 2.08 | 0.43 |
| E | 0.47 | 0.68 | 1.11 | 0.063 | 0.15 | 0.08 | F + P | 0.08 | 0.13 | 0.88 | 0.84 | 0.94 |
| F | 0.30 | 0.19 | 1.24 | 0.049 | 0.10 | 0.13 | F + P | 0.48 | 0.06 | 0.77 | 1.48 | 0.60 |
| G | 0.34 | 1.14 | 1.33 | 0.059 | 0.13 | 0.09 | F + P | 0.24 | 0.07 | 0.86 | 1.18 | 0.86 |
| H | 0.34 | 0.75 | 0.55 | 0.060 | 0.14 | 0.10 | F + P | 0.32 | 0.04 | 0.68 | 1.44 | 0.78 |
| I | 0.31 | 0.73 | 2.33 | 0.072 | 0.13 | 0.06 | F + P + B | 0.13 | — | 0.93 | — | 0.90 |
| J | 0.35 | 0.61 | 1.35 | 0.021 | 0.17 | 0.09 | F + P | 0.29 | 0.14 | 0.85 | 1.04 | 0.78 |
| K | 0.31 | 0.43 | 1.16 | 0.098 | 0.14 | 0.10 | F + P | 0.45 | 0.03 | 0.71 | 1.60 | 0.64 |
| L | 0.31 | 0.61 | 1.21 | 0.068 | 0.04 | 0.07 | F + P | 0.37 | 0.05 | 0.69 | 1.40 | 0.72 |
| M | 0.32 | 0.75 | 1.46 | 0.077 | 0.34 | 0.14 | F + P + B | 0.09 | — | 0.94 | — | 0.94 |
| N | 0.32 | 0.67 | 1.35 | 0.044 | 0.12 | 0.01 | F + P | 0.49 | 0.06 | 0.67 | 1.47 | 0.61 |
| O | 0.34 | 0.43 | 1.10 | 0.060 | 0.11 | 0.26 | F + P | 0.22 | 0.06 | 1.01 | 1.18 | 0.85 |

(Note 1)
The balance is made of Fe and impurities.
(Note 2)
F: ferrite, P: pearlite, B: bainite
(Note 3)
α: ferrite fraction, Dp: average pearlite grain size
(Note 4)
Fn1 = C + 0.10 Si + 0.20 Mn − 0.71 S + 0.23 Cr + 1.65 V,
Fn2 = 1.4 − 1.1 x (1 − α) + 0.16 Dp$^{-1/2}$,
Fn3 = (1 − α) + α x (0.3 Si + 0.8 V)

In table 2, hardness test results, tensile test results, Charpy impact test results at room temperature and −40 degree centigrade, and also the wear test results are shown.

TABLE 2

| Steel | Hardness (HRC) | Tensile Strength (MPa) | Charpy Impact Value | | Wear Amount (mg) |
|---|---|---|---|---|---|
| | | | $UE_{RT}$ (J/cm$^2$) | $UE_{-40}$ (J/cm$^2$) | |
| A | 19.6 | 759 | 84 | 64 | 190 |
| B | 24.1 | 822 | 68 | 51 | 140 |
| C | 21.3 | 774 | 81 | 63 | 180 |
| D | 21.0 | 779 | 129 | 85 | 290 |
| E | 26.5 | 875 | 57 | 11 | 110 |
| F | 21.6 | 771 | 85 | 71 | 250 |
| G | 25.4 | 849 | 69 | 43 | 140 |
| H | 17.3 | 732 | 78 | 53 | 200 |
| I | 30.8 | 972 | 78 | 52 | 170 |
| J | 24.7 | 852 | 57 | 29 | 130 |
| K | 20.0 | 733 | 74 | 71 | 190 |
| L | 17.4 | 729 | 80 | 57 | 190 |
| M | 32.4 | 1009 | 65 | 53 | 160 |
| N | 16.6 | 711 | 92 | 65 | 230 |
| O | 32.7 | 1013 | 64 | 44 | 120 |

(Note) $UE_{RT}$ : Impact value at room temperature
$UE_{-40}$ : Impact value at −40° C.

Figure 2:
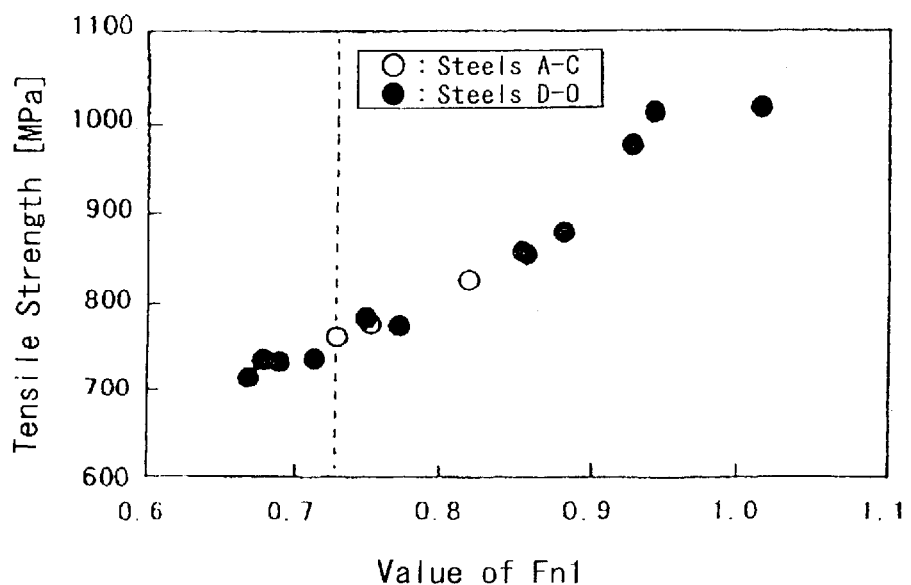
FIG. 2 is a diagram showing tensile test results (tensile strength) of Table 2 that are put in order in relation to the values of Fn1.

FIG. 2 is a diagram in which relationship between the tensile test results (tensile strength) and the values of Fn1 shown in the Table 2 are put in order. In the drawing, the "○" marks show steels A, B and C that have chemical compositions in the range of the provision of the invention among the steels shown in Table 1. On the other hand, the "●" marks show steels D through O, whose chemical compositions are out of the provision, according to the invention among the steels shown in Table 1.

As can be confirmed also from FIG. 2, when the value of Fn1 of the steel is made 0.73 or more, the tensile strength of 750 MPa or more can be stably ensured.

Figure 3:
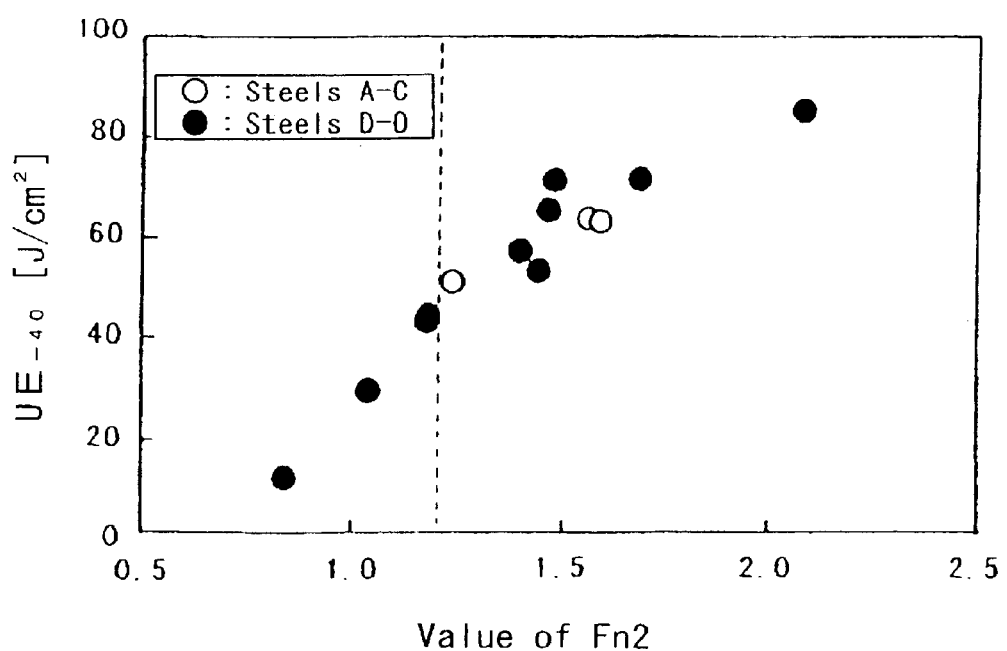
FIG. 3 is a diagram showing Charpy impact test results (impact value) at −40 degree centigrade of Table 2 that are put in order in relation to the values of Fn2.

FIG. 3 is a diagram in which relationship between the impact values ($UE_{-40}$) of the Charpy impact test results at −40degree centigrade and the values of Fn2 shown in the Table 2 are put in order. Similarly to the case of FIG. 2, the "○" marks in FIG. 3 show steels A, B and C whose chemical compositions are in the range of the provision of the invention among the steels shown in Table 1. Furthermore, the "●" marks in FIG. 3 show steels D through O, whose chemical compositions are out of the provision, according to the invention among the steels shown in Table 1.

As can be confirmed from this FIG. 3, when the value of Fn2 of the steel is made 1.20 or more, such large Charpy impact value at −40 degree centigrade as 50 J/cm$^2$ or more, can be stably ensured.

Figure 4:
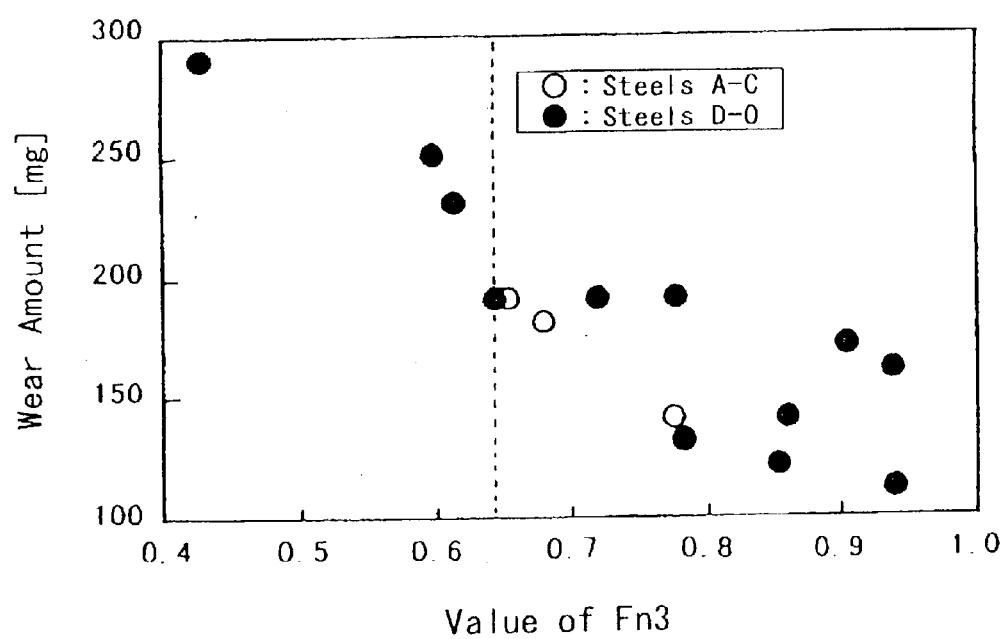
FIG. 4 is a diagram showing wear test results (wear amount) of Table 2 that are put in order in relation to the values of Fn3.

FIG. 4 is a diagram in which relationship between the wear test results (wear amount) and the values of Fn3 shown in Table 2 are put in order. Also in this FIG. 4, the "○" marks show steels A, B and C whose chemical compositions are in the range of the provision of the invention among the steels shown in Table 1, and the "●" marks show steels D through O whose chemical compositions are out of the provision, according to the invention among the steels shown in Table 1.

From this FIG. 4, it can be confirmed that when the value of Fn3 of the steel is made 0.64 or more, sufficient wear resistance can be ensured and the wear amount can be made 200 mg or less.

Summarizing the foregoing, typical embodiments of the present invention concerning to the non-heat treated crankshaft, are shown in the following examples (1) to (7).

(1) A non-heat treated crankshaft which comprises, in % by mass, C: 0.30 to 0.35%, Si:0.40 to 0.80%, Mn: 1.00 to 2.00%, S: 0.040 to 0.080%, Cr: 0.10 to 0.30%, and V: 0.05 to 0.20%, with the balance being Fe and impurities, and of which the microstructure is a ferrite-pearlite microstructure whose ferrite fraction α is in the range of 0.20 to 0.60 and average pearlite grain size Dp is 0.08 mm or less, and the value of Fn1 defined by the aforementioned equation (1) being 0.73 or more, the value of Fn2 defined by the aforementioned equation (2) being 1.20 or more, and the value of Fn3 defined by the aforementioned equation (3) being 0.64 or more.

(2) A non-heat treated crankshaft according to (1), which further comprises, at least one or more elements selected from among Ti: 0.050% or less, Zr: 0.050% or less and Nb: 0.050% or less in lieu of part of Fe.

(3) A non-heat treated crankshaft according to (1), which further comprises, one or both elements of Pb: 0.30% or less and Ca: 0.010% or less in lieu of part of Fe.

(4) A non-heat treated crankshaft according to (1), which further comprises, at least one or more elements selected from among Ti: 0.050% or less, Zr: 0.050% or less and Nb: 0.050% or less, and one or both elements of Pb: 0.30% or less and Ca: 0.010% or less in lieu of part of Fe.

(5) A crankshaft that is made of a steel which comprises, in % by mass, C: 0.30 to 0.35%, Si: 0.40 to 0.80%, Mn: 1.00 to 2.00%, S: 0.040 to 0.080%, Cr: 0.10 to 0.30%, arid V: 0.05 to 0.20%; with the balance being Fe and impurities; wherein a microstructure when subjected to the atmospheric cooling after the hot forging is a ferrite-pearlite microstructure; its ferrite fraction α is in the range of 0.20 to 0.60; an average pearlite grain size Dp is 0.08 mm or less; and of which the value of Fn1 defined by the aforementioned equation (1) being 0.73 or more, the value of Fn2 defined by the aforementioned equation (2) being 1.20 or more, and the value of Fn3 defined by the aforementioned equation (3) being 0.64 or more.

(6) A crankshaft according to (5), that is made of a steel which further comprises, in % by mass, at least one or more elements selected from among Ti: 0.050% or less, Zr: 0.050% or less, and Nb: 0.050% or less.

(7) A crankshaft according to (5) or (6), that is made of a steel which further comprises, in % by mass, one or both elements of Pb: 0.30% or less and Ca: 0.010% or less.

DESCRIPTION OF THE PREFERRED EMBODIMENTS

In the following, the present invention will be further detailed with embodiments.

Embodiment

Steels having chemical compositions shown in Table 3 were manufactured through a melting process in a 180 kg vacuum melting furnace and billets were produced. Billets of steels 1 through 5 and 8 were heated to a temperature of 1200 degree centigrade or more, followed by hot forging into a round bar having a diameter of 20 mm and a length of 100 mm. As for steels 6, 7, 9 and 10, billets were heated to a temperature of 1200 degree centigrade or more, followed by hot forging into round bars which have a diameter of 20 mm, 60 mm and 100 mm respectively, and a plate having a length of 200 mm, a width of 100 mm and a thickness of 25 mm.

The round bars having a diameter of 20 mm according to the steels 1 through 9 were further heated to a temperature of 1150 degree centigrade and held there for 1 hr followed by atmospheric cooling.

From the center portion of the round bar, having a diameter of 20 mm, JIS 14A test pieces for the tensile test, and U notch test pieces, having a width of 10 mm that are described in JIS Z 2202-1998 (No.3 Charpy impact test piece described in JIS Z 2202-1980) were cut out and were subjected to the tensile test at room temperature, and the impact test at room temperature and at −40 degree centigrade.

Their hardness was measured with a Rockwell hardness tester on a surface perpendicular to the forging direction of the round bar having a diameter of 20 mm.

The microstructure observation was carried out as follows:

After the surface perpendicular to the forging direction of the round bar, having a diameter of 20 mm was polished, it was etched with 5% natal and a portion at D/4 (an intermediate portion between a surface and a center of the bar, namely, D means the diameter of the round bar) was observed by the use of an optical microscope under a magnification of 200. Following this the ratio of the ferrite (ferrite fraction α) and the average grain size of the pearlite (average pearlite grain size Dp) were measured.

Figure 5A:
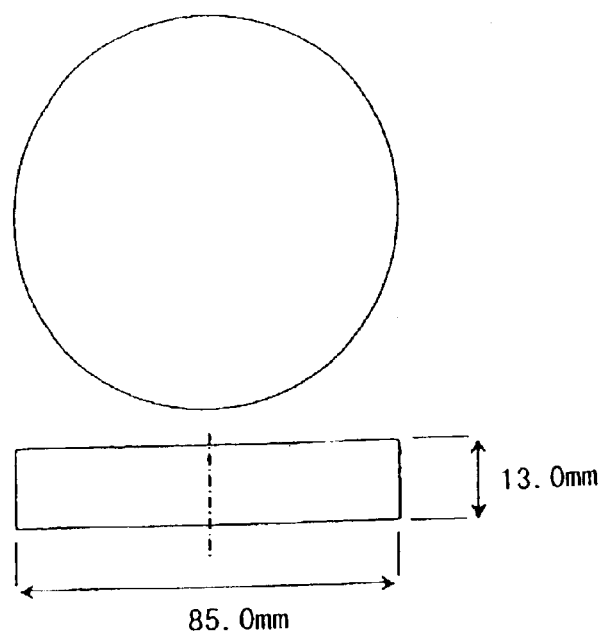
FIG. 5A is a diagram showing a shape of a disc-like test piece supplied for the wear test.
Figure 5B:
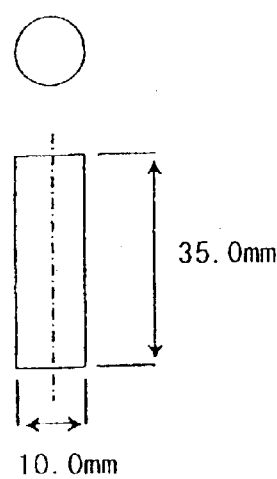
FIG. 5B is a diagram showing a shape of a pin-like test piece supplied for the wear test.
Figure 6:
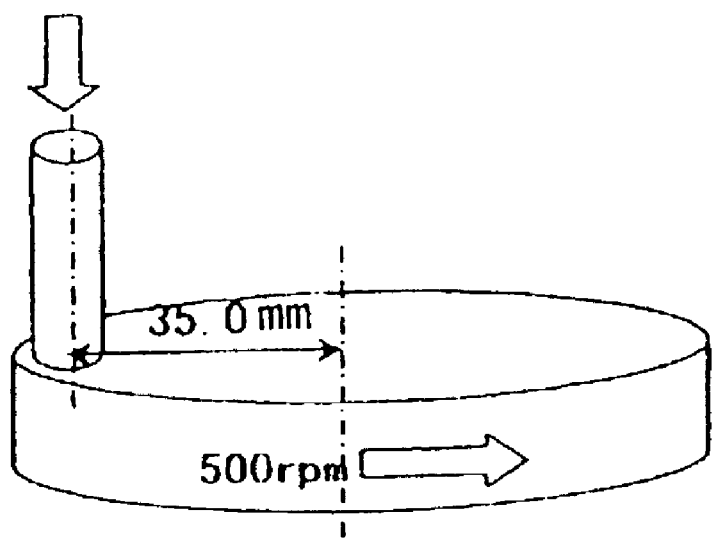
FIG. 6 is a schematic diagram for explaining a procedure of a pin-disc type wear test.

From each of the round bars, having a diameter of 100 mm according to the steels 1 through 9, a sample having a diameter of 100 mm and a thickness of 20 mm, was cut out and heated to a temperature of 1200 degree centigrade and held there for 1 hr followed by atmospheric cooling. Subsequently, the sample was finished into a diameter of 85 mm and a thickness of 13 mm and supplied as a "disc-like test piece" for the pin-disc type wear test shown in FIG. 5A. Furthermore, a "pin-like test piece", having a diameter of 10 mm and a length of 35 mm shown in FIG. 5B, was cut out from a quench-and-tempered steel equivalent to SUJ2 of high carbon chromium bearing steel defined in JIS G 4805. As shown in FIG. 6, at room temperature, under unlubricated conditions, the pin-disc type wear test was performed.

The wear test was carried out under the conditions of a pressing load of the pin-like test piece of 49 N (5 kgf) and a rotation number of the disc-like test piece at 500 rpm, and after 10000 m sliding, a wear mass of the disc-like test piece was measured.

As for steel 10, that is described in Table 3 and corresponds to JIS S48C that is carbon steel for machine structural use that has so far been used, round bars having a diameter of 20 mm and 100 mm, respectively, are heated to 850 degree centigrade and held there for 1 hr followed by water cooling, and further heated to 550 degree centigrade and held there for 1.5 hr followed by water cooling, thereafter test pieces similar to the above steels 1 through 9 were cut out, and the tensile test, the Charpy impact test, the hardness measurement, the microstructure observation and the wear test were carried out.

As for steels 6, 7, 9, and 10, with the round bars having 60 mm diameter and plates having 200 mm length and 100 mm width and 25 mm thickness, a drilling test and a turning test were carried out in order to evaluate the machinability.

The drilling test and turning test were performed according to the following procedure.

The round bars having 60 mm diameter, and plates having 200 mm length, 100 mm width and 25 mm thickness of steels 6, 7 and 9 were heated to 1200 degree centigrade and held there for 1 hr followed by atmospheric cooling. Furthermore, the round bar having 60 mm diameter, and plate having 200 mm length, 100 mm width and 25 mm thickness of steel 10 that corresponds to JIS S48C, were heated to 850 degree centigrade and held there for 1 hr followed by water cooling, and further heated to 550 degree centigrade and held there for 2 hr followed by water cooling.

From the plate having 200 mm length, 100 mm width and 25 mm thickness, a plate test piece, having length of 180 mm, width of 90 mm and thickness of 20 mm was cut out, and with a 6 mm diameter drill made of high speed tool steel (SKH51, defined in JIS G 4403), a drilling test was carried out under the following conditions: measuring the amount of the flank wear of the tool when 200 throughholes of 20 mm each were bored in a perpendicular direction to the plate.

Cutting speed: 20 m/min,
Feed per revolution: 0.10 mm/rev, and
Lubrication: wet lubrication.

Furthermore, from the round bar having diameter of 60 mm, a round bar-like test piece, having a diameter of 58 mm was cut out, and with a tip of a TiN coated carbide tool P20, a turning test was carried out under the following conditions: measuring the amount of the flank wear when an external periphery was turned for 20 min in the longitudinal direction of the test piece.

Cutting speed: 160 m/min,
Feed amount per revolution: 0.25 mm/rev,
Depth of cut: 2.0 mm, and
Lubrication: dry lubrication.

In Table 3, together with the chemical compositions, microstructure observation results and the values of Fn1, Fn2 and Fn3 calculated from the chemical compositions and microstructure observation results, are shown. "F+P" in a microstructure column of Table 3 means a mixed microstructure of ferrite and pearlite, and "M" means martensite.

Steels 8 and 9 in Table 3 are comparative examples in which one or more of values of the Fn1, Fn2 and Fn3 are deviated from the provision of the invention. Furthermore, as mentioned above, the steel 10 corresponds to S48C that is carbon steel for machine structural use, defined in JIS G 4501.

TABLE 3

| | Chemical composition (% by mass) | | | | | | Microstructure | | | | | |
|---|---|---|---|---|---|---|---|---|---|---|---|---|
| Steel | C | Si | Mn | S | Cr | V | Others | Phase | α | Dp (mm) | Fn1 | Fn2 | Fn3 |
| 1 | 0.33 | 0.70 | 1.40 | 0.055 | 0.21 | 0.08 | — | F + P | 0.35 | 0.05 | 0.81 | 1.39 | 0.74 |
| 2 | 0.33 | 0.70 | 1.29 | 0.056 | 0.18 | 0.07 | — | F + P | 0.36 | 0.05 | 0.78 | 1.41 | 0.74 |
| 3 | 0.33 | 0.73 | 1.26 | 0.055 | 0.17 | 0.07 | Ti:0.021 | F + P | 0.39 | 0.05 | 0.77 | 1.42 | 0.72 |
| 4 | 0.32 | 0.67 | 1.32 | 0.051 | 0.11 | 0.07 | Zr:0.040 | F + P | 0.41 | 0.06 | 0.76 | 1.43 | 0.70 |
| 5 | 0.33 | 0.64 | 1.23 | 0.064 | 0.15 | 0.07 | Nb:0.025 | F + P | 0.42 | 0.04 | 0.74 | 1.56 | 0.68 |
| 6 | 0.31 | 0.53 | 1.25 | 0.052 | 0.20 | 0.08 | Pb:0.08 | F + P | 0.46 | 0.05 | 0.75 | 1.51 | 0.64 |
| 7 | 0.33 | 0.50 | 1.13 | 0.055 | 0.18 | 0.11 | Ca:0.0012 | F + P | 0.33 | 0.06 | 0.79 | 1.34 | 0.75 |
| 8 | 0.31 | 0.62 | 1.21 | 0.069 | 0.16 | 0.05 | — | F + P | 0.52 | 0.05 | 0.68 | 1.63 | 0.60 |

TABLE 3-continued

| | Chemical composition (% by mass) | | | | | | Microstructure | | | | | |
|---|---|---|---|---|---|---|---|---|---|---|---|---|
| Steel | C | Si | Mn | S | Cr | V | Others | Phase | α | Dp (mm) | Fn1 | Fn2 | Fn3 |
| 9 | 0.35 | 0.74 | 1.59 | 0.041 | 0.24 | 0.10 | — | F + P | 0.21 | 0.08 | 0.93 | 1.10 | 0.85 |
| 10 | 0.48 | 0.20 | 0.76 | 0.021 | 0.18 | — | — | M | — | — | — | — | — |

(Note 1)
The balance is made of Fe and impurities.
(Note 2)
F: ferrite, P: pearlite, M: martensite
(Note 3)
α: ferrite fraction, Dp: average pearlite grain size
(Note 4)
Fn1 = C + 0.10 Si + 0.20 Mn − 0.71 S + 0.23 Cr + 1.65 V,
Fn2 = 1.4 − 1.1 × (1 − α) + 0.16 $Dp^{-1/2}$,
Fn3 = (1 − α) + α × (0.3 Si + 0.8 V)

In Table 4, the results of tensile test, Charpy impact test, hardness measurement, microstructure observation, wear test, drilling test and turning test are shown.

TABLE 4

| Steel | Hardness (HRC) | Tensile Strength (MPa) | Charpy Impact Value | | Wear Amount (mg) | Flank Wear Amount of Tool (mm) | |
|---|---|---|---|---|---|---|---|
| | | | $UE_{RT}$ (J/cm²) | $UE_{-40}$ (J/cm²) | | Drilling Test | Turning Test |
| 1 | 23.5 | 819 | 66 | 62 | 150 | — | — |
| 2 | 22.6 | 795 | 75 | 56 | 160 | — | — |
| 3 | 21.7 | 786 | 76 | 57 | 160 | — | — |
| 4 | 20.5 | 775 | 78 | 59 | 180 | — | — |
| 5 | 20.9 | 779 | 81 | 62 | 180 | — | — |
| 6 | 21.4 | 774 | 81 | 64 | 190 | 0.11 | 0.08 |
| 7 | 23.2 | 803 | 73 | 55 | 170 | 0.17 | 0.04 |
| 8 | 17.9 | 721 | 94 | 61 | 210 | — | — |
| 9 | 27.2 | 894 | 67 | 40 | 130 | 0.29 | 0.09 |
| 10 | 19.9 | 787 | 82 | 61 | 230 | 0.28 | 0.10 |

(Note)
$UE_{RT}$: Impact value at room temperature
$UE_{-40}$: Impact value at −40° C.

Figure 7:
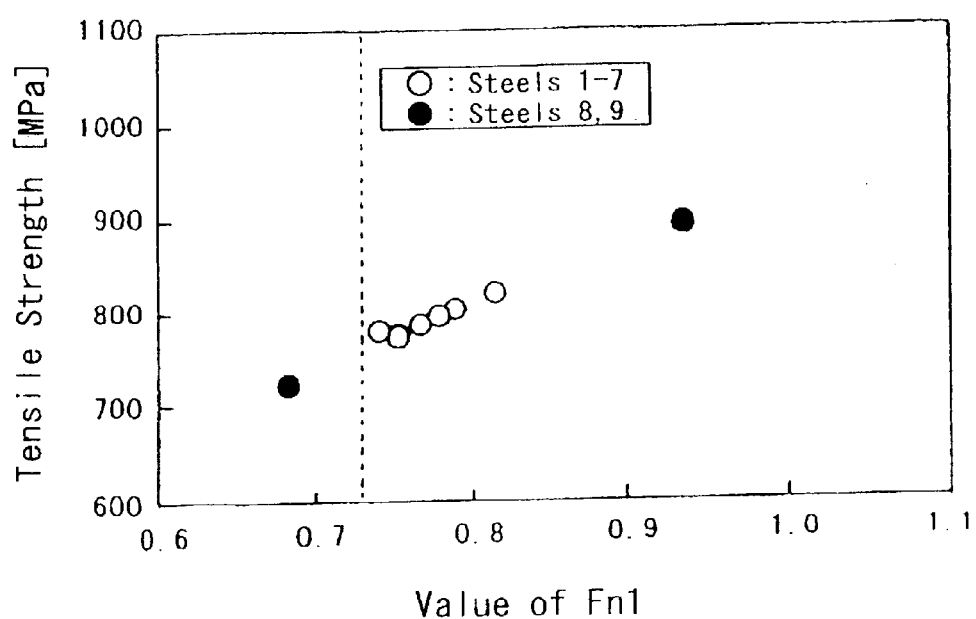
FIG. 7 is a diagram showing tensile test results (tensile strength) of Table 4 that are put in order in relation to the values of Fn1.
Figure 8:
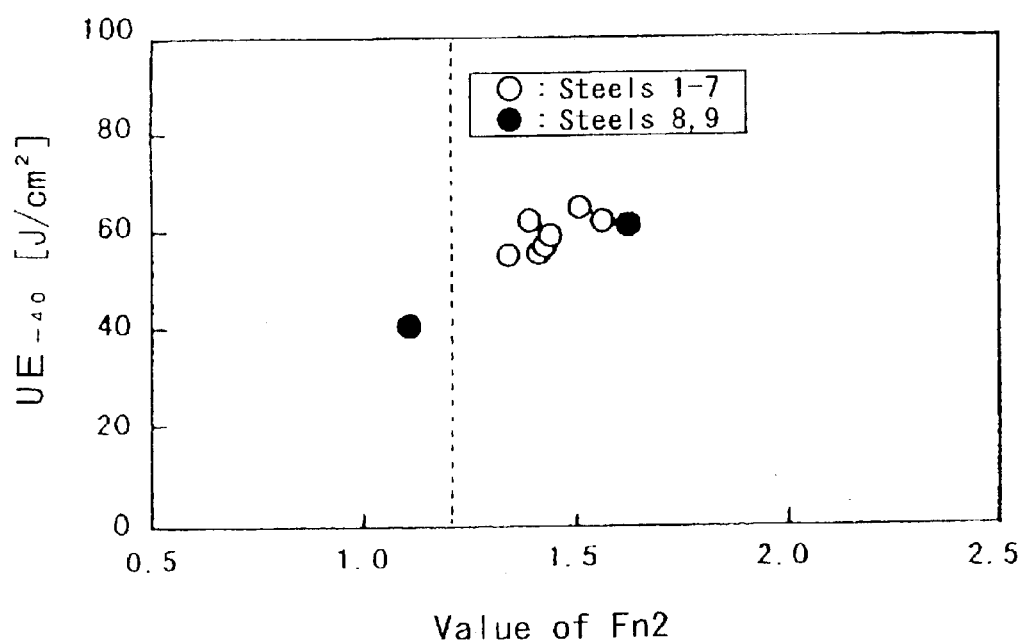
FIG. 8 is a diagram showing Charpy impact test results (impact value) at −40 degree centigrade of Table 4 that are put in order in relation to the values of Fn2.
Figure 9:
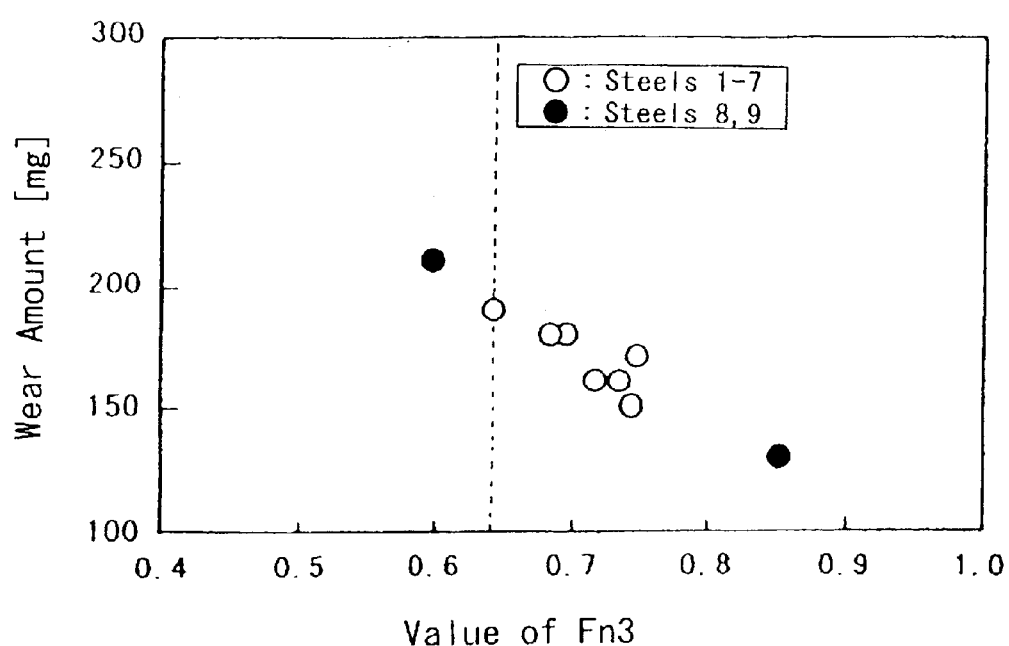
FIG. 9 is a diagram showing wear test results (wear amount) of Table 4 that are put in order in relation to the values of Fn3.

In FIGS. 7, 8 and 9, as for steels 1 through 9, the relationship between the tensile test results (tensile strength) and the values of Fn1; the relationship between the impact values ($UE_{-40}$) of the Charpy impact test and the values of Fn2; and the relationship between the wear test results (wear amount) and the values of Fn3 are shown in order. In these drawings, the "○" marks show steels 1 through 7 that have chemical compositions in the range of the provision of the invention among the steels shown in Table 3. On the other hand, the "●" marks show steels 8 and 9 whose one or more of the values of Fn1, Fn2 and Fn3 are deviated from the provision of the invention among the steels shown in Table 3.

The followings can be confirmed from the results shown in Tables 3 and 4, and FIGS. 7, 8 and 9.

It was found that steels 1 through 7, in which chemical compositions, microstructure observation results and the values of Fn1, Fn2 and Fn3 are in the range provided by the invention, are equivalent or superior, in the tensile strength, impact value and wear resistance, to the thermally refined material of steel 10, which is an S48C corresponding material of carbon steel for machine structural use, that has been used up to this point in time.

On the other hand, using steel 8 as a comparative example, though satisfying the chemical composition, ferrite fraction α and average pearlite grain size Dp defined in the invention, does not satisfies the values of Fn1 and Fn3 defined in the invention, and therefore, it results in lower mechanical strength and inferior wear resistance.

Furthermore, using steel 9 as a comparative example, though satisfying the chemical composition, ferrite fraction α and average pearlite grain size Dp defined in the invention, does not satisfy the value of Fn2 defined in the invention, and therefore, it results in lower impact value.

Finally, it was found that, in the steels 6 and 7 according to the invention, in comparison with the steel 9 according to the comparative example and the thermally refined steel 10 corresponding to S48C that is an existing example, the tool wear amount is reduced.

INDUSTRIAL APPLICABILITY

As explained above, according to the invention, a non-heat treated crankshaft that has the tensile strength of 750 MPa or more, a low temperature toughness (Charpy impact value), a wear resistance equivalent to one that is obtained by applying a quenching and tempering heat-treatment to steel which being equivalent to carbon steel for machine structural use, for example S48C, that is an existing steel defined in JIS, can be realized. Thus, the non-heat treated crankshaft according to the invention, without undergoing thermal refining, can exhibit excellent mechanical strength, excellent low temperature toughness and excellent wear resistance. Accordingly, when applied in engines for working machine and general-purpose engines, such as lawn mowers, electric generators, snow blowers, pumps and outboard motors, a high performance, capable of operating in extreme cold weather, can be expected. Also other useful industrial applications can be acquired.

What is claimed is:

1. A non-heat treated crankshaft which comprises, in % by mass, C: 0.30 to 0.35%, Si: 0.40 to 0.80%, Mn: 1.00 to 2.00%, S: 0.040 to 0.080%, Cr: 0.10 to 0.30% and V: 0.05 to 0.20%; with the balance being Fe and impurities; and of which the microstructure is a ferrite-pearlite microstructure whose ferrite fraction $\alpha$ is 0.20 to 0.60 and average pearlite grain size Dp is 0.08 mm or less, and the value of Fn1 defined by the following equation (1) being 0.73 or more, the value of Fn2 defined by the following equation (2) being 1.20 or more and the value of Fn3 defined by the following equation (3) being 0.64 or more;

$$Fn1 = C + 0.10Si + 0.20Mn - 0.71S + 0.23Cr + 1.65V \qquad (1),$$

$$Fn2 = 1.4 - 1.1 \times (1-\alpha) + 0.16\, Dp^{-\frac{1}{2}} \qquad (2),$$

$$Fn3 = (1-\alpha) + \alpha \times (0.3Si + 0.8V) \qquad (3),$$

where an element symbol appearing in the equations (1) and (3) represents the contents in mass percent of the corresponding elements in the steel.

2. A non-heat treated crankshaft, according to claim 1, which further comprises at least one or more elements selected from among Ti: 0.050% or less, Zr: 0.050% or less and Nb: 0.050% or less in lieu of part of Fe.

3. A non-heat treated crankshaft, according to claim 1, which further comprises one or both elements of Pb: 0.30% or less and Ca: 0.010% or less in lieu of part of Fe.

4. A non-heat treated crankshaft, according to claim 1, which further comprises at least one or more elements selected from among Ti: 0.050% or less, Zr: 0.050% or less and Nb: 0.050% or less, and one or both elements of Pb: 0.30% or less and Ca: 0.010% or less in lieu of part of Fe.

* * * * *